United States Patent
Sethuraman et al.

(10) Patent No.: US 8,364,935 B2
(45) Date of Patent: Jan. 29, 2013

(54) DATA PROCESSING APPARATUS ADDRESS RANGE DEPENDENT PARALLELIZATION OF INSTRUCTIONS

(75) Inventors: Ramanathan Sethuraman, Eindhoven (NL); Balakrishnan Srinivasan, Eindhoven (NL); Carlos Antonio Alba Pinto, Eindhoven (NL); Harm Johannes Antonius Maria Peters, Eindhoven (NL); Rafael Peset Llopis, Eindhoven (NL)

(73) Assignee: Nytell Software LLC, Wilmington, DE (US)

( * ) Notice: Subject to any disclaimer, the term of this patent is extended or adjusted under 35 U.S.C. 154(b) by 1455 days.

(21) Appl. No.: 10/530,495

(22) PCT Filed: Oct. 1, 2003

(86) PCT No.: PCT/IB03/04327
§ 371 (c)(1),
(2), (4) Date: Apr. 6, 2005

(87) PCT Pub. No.: WO2004/034253
PCT Pub. Date: Apr. 22, 2004

(65) Prior Publication Data
US 2006/0004986 A1    Jan. 5, 2006

(30) Foreign Application Priority Data
Oct. 11, 2002    (EP) .................................. 02079219

(51) Int. Cl.
*G06F 15/76*    (2006.01)
*G06F 9/30*    (2006.01)

(52) U.S. Cl. .......................................... 712/24; 712/205

(58) Field of Classification Search ................... 712/24, 712/215, 229, 23, 204, 4, 210, 225, 228, 712/219, 209; 711/125, 127, 129, 173, 220, 711/5; 718/103, 108; 708/520; 713/502
See application file for complete search history.

(56) References Cited

U.S. PATENT DOCUMENTS
(Continued)

FOREIGN PATENT DOCUMENTS
EP    0324308 A2    7/1989
EP    0324308 A3    7/1989
(Continued)

OTHER PUBLICATIONS
David J. Lilja, Exploiting the Parallelism Available in Loops, Feb. 1994, IEEE, Computer vol. 27 Issue 2.*

*Primary Examiner* — Jacob A Petranek
(74) *Attorney, Agent, or Firm* — McAndrews, Held & Malloy, Ltd.

(57) ABSTRACT

A data processing apparatus has an instruction memory system arranged to output an instruction word addressed by an instruction address. An instruction execution unit, processes a plurality of instructions from the instruction word in parallel. A detection unit, detects in which of a plurality of ranges the instruction address lies. The detection unit is coupled to the instruction execution unit and/or the instruction memory system, to control a way in which the instruction execution unit parallelizes processing of the instructions from the instruction word, dependent on a detected range. In an embodiment the instruction execution unit and/or the instruction memory system adjusts a width of the instruction word that determines a number of instructions from the instruction word that is processed in parallel, dependent on the detected range.

16 Claims, 4 Drawing Sheets

U.S. PATENT DOCUMENTS

| | | | |
|---|---|---|---|
| 5,774,737 A | 6/1998 | Nakano | |
| 5,937,193 A * | 8/1999 | Evoy | 717/140 |
| 5,941,980 A * | 8/1999 | Shang et al. | 712/204 |
| 5,963,738 A * | 10/1999 | Yamaki et al. | 713/100 |
| 6,026,479 A * | 2/2000 | Fisher et al. | 712/24 |
| 6,026,486 A * | 2/2000 | Kodama et al. | 712/229 |
| 6,085,306 A * | 7/2000 | Takayama et al. | 712/24 |
| 6,735,690 B1 * | 5/2004 | Barry et al. | 712/244 |
| 7,149,878 B1 * | 12/2006 | Jensen et al. | 712/209 |
| 2002/0116596 A1 * | 8/2002 | Sanches et al. | 712/24 |
| 2002/0129201 A1 * | 9/2002 | Maiyuran et al. | 711/113 |
| 2002/0133692 A1 * | 9/2002 | Matsuo | 712/244 |
| 2003/0065905 A1 | 4/2003 | Ishii | |

FOREIGN PATENT DOCUMENTS

| | | |
|---|---|---|
| EP | 0324308 B1 | 7/1989 |

* cited by examiner

DATA PROCESSING APPARATUS ADDRESS RANGE DEPENDENT PARALLELIZATION OF INSTRUCTIONS

The invention relates to a data processing apparatus, such as a VLIW (Very Long Instruction Word) processor, that is capable of executing a plurality of instructions from an instruction word in parallel.

A VLIW processor makes it possible to execute programs with a high degree of instruction parallelism. Conventionally, in each instruction cycle the VLIW processor fetches an instruction word that contains a fixed number, greater than one, of instructions (often called operations). The VLIW processor executes these operations in parallel in the same instruction cycle (or cycles). For this purpose the VLIW processor contains a plurality of functional units, each capable of executing one of the operations from the instruction word at a time. Different kinds of functional units are typically provided, such as ALU's (arithmetic logic units), multipliers, branch control units, memory access units etc. Often dedicated purpose functional units are also included, designed to speed up programs for a particular applications. Thus, for example, functional units for performing parts of MPEG encoding or decoding may be added.

In large sections of programs, however, it is impossible to supply operations to all functional units in every instruction cycle. This occurs for example when insufficient data is available to start operations in all functional units. In this case, "no-operation" instructions have to be included in the instruction word for the functional units for which no instruction is available. When such instruction words have to be kept in instruction memory this leads to excessive memory use.

Several measures have been proposed to reduce this excessive memory use. For example, instructions may be compressed, by encoding no-operation instructions more efficiently than other instructions. However, this still involves memory overhead and it potentially slows down the processor. In another development, it has been known to use fields in the instruction word for clusters of functional units, so that any one functional unit of a cluster can get an instruction from the field per instruction cycle. Because the instruction word thus contains only one field for a plurality of functional units this reduces the size of the instruction word, but it reduces the maximum level of parallelism.

U.S. Pat. No. 5,774,737 describes that a single VLIW processor may use instructions with different lengths. The instructions may contain a length code, to indicate their length. Alternatively, an instruction length register may be used which indicates a current length. The functional units execute the number of instructions indicated by the value of the length in the instruction length register. By setting the current length the instruction length can be adapted to the level of parallelism that is permitted in different parts of the program. However, setting the current length involves execution of additional instructions.

Amongst others, it is an object of the invention to improve the memory efficiency of processors that are capable of executing a plurality of instructions from an instruction word in parallel.

Amongst others, it is a further object of the invention to facilitate the use of dedicated purpose functional units without causing excessive memory use.

The processing apparatus according to the invention is set forth in claim 1. According to the invention, detection of the range of addresses from which an instruction word is fetched is used to determine the way in which the instruction execution unit parallelizes processing of the instructions from the instruction word.

In one embodiment, for example, the length of the instruction word is dependent on the range to which its address belongs. Thus, the instruction execution unit may treat information from the instruction memory as relatively longer instruction words, containing relatively more instructions, when these words come from a range of addresses that refer to instructions from the inner loop of a program and the instruction execution may treat the information as relatively shorter instruction words, containing relatively fewer instructions, when these words come from another range of addresses. Thus, high parallelism can be realized in the inner loop and high storage efficiency can be realized outside the inner loop, without need for explicit instructions to change the instruction word length when passing into or out of the inner loop.

In a further embodiment the instruction memory system is adapted to adjust the width of the instruction words that are fetched dependent on the address range. Different types of memory, for example with different speeds, may be used for different ranges. Preferably the supply of clock signals to a part of the instruction memory is disabled when the instruction addresses are not in a range that maps to that part of the instruction memory.

In another embodiment, the instruction execution unit contains a plurality of functional units for executing different instructions from the instruction word. In this embodiment different ones of the functional units are selected to execute instructions from the instruction word, dependent on the address range from which the instruction word is read. Thus, instructions from the instruction word may be treated as instructions for dedicated purpose functional units in one range of addresses and as instructions for other functional units in another range of addresses. MPEG decoding and encoding, for example, is typically limited to specific parts of a program, and therefore functional units that are dedicated to the purpose of such decoding and encoding are only needed in those parts of the program. By selecting these functional units on the basis of the address range, there is no need for an increased width of the instruction word to select which functional units should process the instruction.

In a further embodiment the functional units may use instructions with different widths. Thus, instructions for an ALU functional unit may involve designations of an operation, two operand registers and a result register, whereas instructions for a dedicated purpose functional unit might involve designations of four operand registers and two result registers. Dependent on the address range the width of instructions in the instruction word may be adapted.

These and other objects and advantageous aspects of the apparatus and method according to the invention will be described in more detail using the following figures.

FIG. 1 shows a data processing apparatus with an instruction addressing unit 10, an instruction memory system 12, an instruction execution unit 14 and an address range detector 16. The instruction addressing unit 10 has an address output coupled to instruction memory system 12. Instruction memory system 12 has an instruction output coupled to instruction execution unit 14. Instruction execution unit has an output coupled to instruction addressing unit. Address range detector 16 has an input coupled to the address output of instruction addressing unit 10 and an output coupled to a control input 11 of instruction execution unit 14 and instruction memory system 12.

Figure 1:
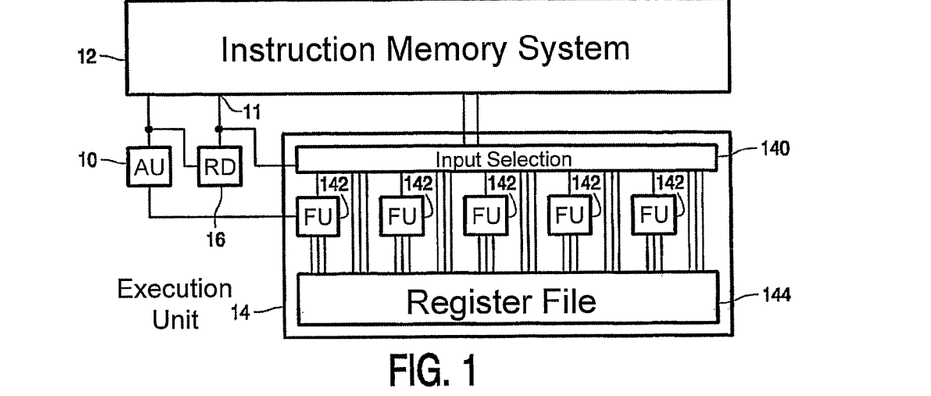
FIG. 1 shows a data processing apparatus

Instruction execution unit 14 contains an input section 140, a plurality of functional units 142, a register file 144. Input section 140 is coupled between instruction memory system 12 and functional units 142. Address range detector 16 is coupled to input section 140. Furthermore, input section 140 has selection outputs coupled to register file 144. Functional units 142 have inputs and outputs coupled to register file 144. At least one of the functional units is a branch control unit having an output coupled to instruction addressing unit 10.

In operation the apparatus operates in successive instruction cycles. In each instruction cycle instruction addressing unit 10 supplies an instruction address to instruction memory system 12. In response instruction memory system 12 retrieves an instruction word addressed by the instruction address and supplies the retrieved instruction word to instruction execution unit 14. Input section 140 passes operation selection codes from the instruction word to functional units 142 and input section 140 register selection codes from the instruction word to the selection inputs of register file 144. In response to the register selection codes, register file 144 retrieves operands from registers in register file 144 and supplies this data to functional units 142. In response to the operation selection codes functional units 142 perform selected processing operations, using the operands as input data, and supply the results of these operations to register file 144. Register file 144 stores these results in registers selected by register selection codes from the instruction word. In general, operation will be pipelined, that is, the various actions in response to an instruction address (retrieving the instruction, retrieving operands, processing, storing the results) will be executed during different instruction cycles, at a time when other ones of the actions are performed for preceding and/or subsequent instruction addresses.

The way instruction words are treated depends on the range of addresses in which the instruction address of the instruction word lies. In one embodiment, the width of the instruction word depends on the range. When the instruction address is in a first range a first number of instructions from the instruction word is executed by the functional units 142 and when the instruction address is in a second range a second number of instructions from the instruction word is executed by the functional units 142. Accordingly, input section 140 receives a detection signal from address range detector 16, indicating the range in which the instruction address lies (if need be delayed by a number of instruction cycles, as appropriate for the pipe-line delay between addressing and supply of the instruction), dependent on the range input section 140 retrieves a greater or smaller number of operation selection codes from the instruction word is supplied to the functional units with a signal to execute the instructions.

Figure 2:
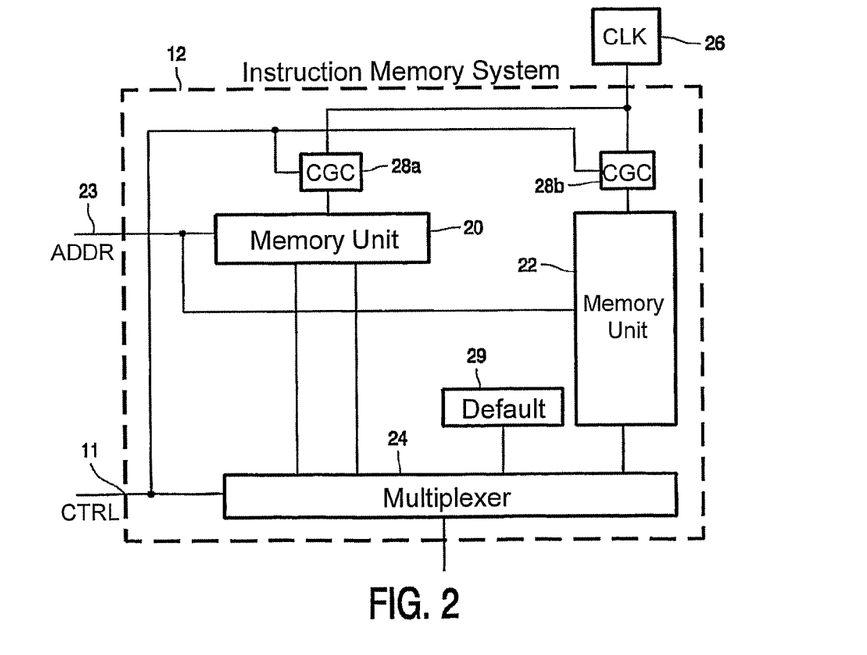
FIG. 2 shows an embodiment of an instruction memory system

FIG. 2 shows an embodiment of instruction memory system 12 for use with instructions of different length. Instruction memory system 12 contains a plurality of memory units 20, 22, a multiplexer 24, and clock gating circuits 28a,b, and is coupled to a clock unit 26. An address input 23 of instruction memory system 12 is coupled at least partly to address the memory units 20, 22. A first one of the memory units 20 has a word size that is larger than the word size of a second one of the memory units 22. (Symbolically a first memory unit 20 is shown wider than second memory unit 22, to indicate the first memory units' wider instruction word size, whereas second memory unit 22 is shown higher than first memory unit 20 to indicate that second memory contains locations for a greater number of instruction words). Instruction outputs of memory units 20, 22 are coupled to inputs of multiplexer 24, the instruction output of the second one of the memory units 22 being coupled to the input of the multiplexer 24 in combination with default input 29 (which supplies for example no-operation instructions). An output of multiplexer 24 is coupled to instruction execution unit 14 (not shown). Clock unit 26 is coupled to clock inputs of memory units 20, 22, each via a respective one of the clock gating circuit 28a,b. An output of address range detector 16 is coupled to an input 11 of instruction memory system 12 that is coupled to a control input of multiplexer 24 and to disable inputs of clock gating circuits 28a,b.

In operation, instruction memory system 12 outputs instruction words to instruction execution unit 14 in response to instruction addresses. When detector 16 indicates that the instruction addresses are in a first range multiplexer 24 outputs instruction words from the first one of the memory units 22 to instruction execution unit 14. When detector 16 indicates that the instruction addresses are in a second range multiplexer 24 outputs instruction words from the second one of the memory units 22 to instruction execution unit 14.

Typically, the first one of the memory units 22 contains instruction words from an inner loop of a program, that is, a part of a program that is repeatedly executed the highest number of times. Usually, the instruction words of such inner loops are optimised so that a maximum use can be made of parallel execution by instruction execution unit 14. Hence, each instruction words from the inner loop mostly contain instructions for a relatively large number of functional units. The second one of the memory units 22 outputs instruction words from outside the inner loop, that are executed less frequently. These instruction words contain instructions for relatively fewer functional units. Accordingly, the second one of the memory units 22 has a smaller instruction word size, outputting fewer bits in response to an instruction address than the first one of the memory units 20. Therefore, more efficient use of memory space is possible. The first one of the memory units 20 stores wider instruction words, this increases efficiency of execution in the inner loops. The first one of the memory units 20 may also be faster than the second one of the memory units 22, permitting shorter instruction cycles in the inner loop.

In principle each memory unit 20, 22 needs to respond only to addresses from a respective one of the address ranges. No memory space needs to be present for addresses in the range to which the other memory unit responds. However, in practice the second one of the memory units 22 may also be responsive to addresses in the range of the first one of the memory units 20. When this range only involves the inner loop, this would cause little memory overhead and it would permit locating the address range of the first one of the memory units 20 anywhere in the memory space of the second one of the memory units 22, so that the second one of the memory units 22 readily provides addresses both in front of and in the rear of this address range.

When the instruction address is not in the range supported by one of the memory units 20, 22, the clock supply to this memory unit 20, 22 is preferably disabled. Thus, power consumption is reduced. On the one hand, during execution of instruction words from the inner loop no clock needs to be supplied to the second one of the memory units 22. On the other hand, during execution of instructions from outside the inner loop no clock needs to be supplied to the first one of the memory units 20. Providing one or both of the memory units 20, 22 with a circuit for disabling its clock when the corresponding memory unit 20, 22 is not needed will reduce power consumption.

FIG. 2 shows two memories, each having locations that are addressed by the instruction address, the locations having different width, dependent on the memory. Although only two memories 20, 22 are shown, it will be understood that a greater number of such memories could be used, each with its own width and each for its own range of addresses. Thus, the width of the memory locations can be more closely adapted to the needs of different parts of the program.

Changing the number of instructions in the instruction words is only one way in which use can be made of the detection of the address range. In another aspect of the invention input section 140 uses the detected range to select which of the functional units 142, or groups of the functional units should execute instructions from the instruction word. In a most basic VLIW processor, each instruction from an instruction word goes to a respective one of the functional units 142. This provides a high potential parallelism, but involves high memory usage. In more advanced VLIW processors, each instruction field from an instruction word can contain an instruction for a programmable one of a respective group of functional units 142. In this case, a code in the instruction word conventionally determines which functional unit of the group should execute the instruction. Still in this case, input section 140 would signal to the selected functional unit 142 that it should execute the instruction. In other more advanced VLIW processors, so-called super functional units are provided which are programmed by instructions that contain information from a plurality of fields in the instruction word, where each of these fields could or would normally be used for a separate instruction. Thus, for example instructions with an abnormally large number of operands can be conveyed.

Figure 2A:
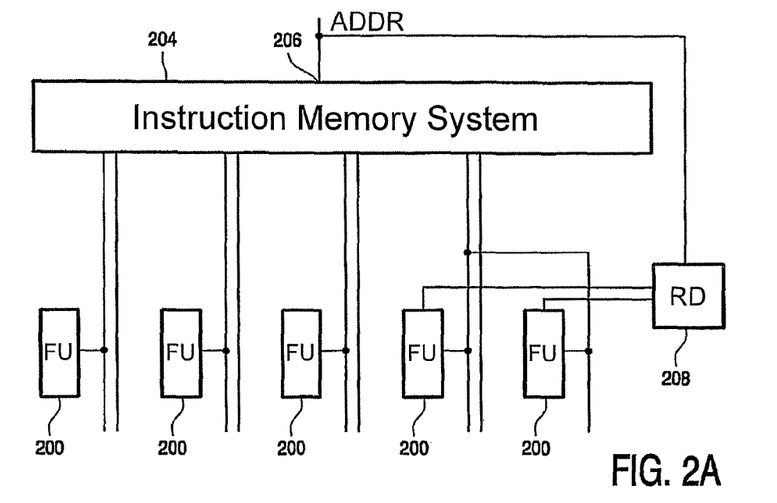
FIG. 2A shows part of a data processing apparatus

FIG. 2A shows part of a data processor with an instruction word memory system 204, with address input 206, functional units 200 (or more generally groups 200 of functional units) and address range detector 208. Instruction memory system 204 has outputs for respective instructions from an addressed instruction word. These outputs are coupled to functional units (or respective groups of functional units) 200 and to a register file (not shown). Address range detector 208 receives the instruction word address and selects which of a number of the functional units (or respective groups of functional units) 200 will execute an instruction from an instruction word, dependent on the range of instruction addressed that the instruction address was detected to belong to. Although selection of functional units (or respective groups of functional units) 200 has been illustrated for one of the instruction words, selection may of course be applied to any number of instructions from the instruction word. Thus, in a first embodiment address range detector 208 selects certain functional units (or respective groups of functional units) 200 to execute an instruction rather than other functional units if the instruction address is detected to be in a certain range, the other functional units being selected when the instruction address is not in that range. Thus smaller instruction words suffice. Accordingly, instruction memory system 204 may disable certain memory units, or the address step size between successive instruction addresses may be reduced. Both reduce the amount of memory needed for instruction words.

In another embodiment instruction memory system 204 provides instructions to all functional units (or groups of functional units) from the instructions words when the instruction address is in a certain range. In this embodiment, address range detector 208 selects all functional units for executing instructions in response to detection that the instruction address was in that range. When the instruction address is outside the range, address range detector 208 selects only a subset of the functional units.

Figure 2B:
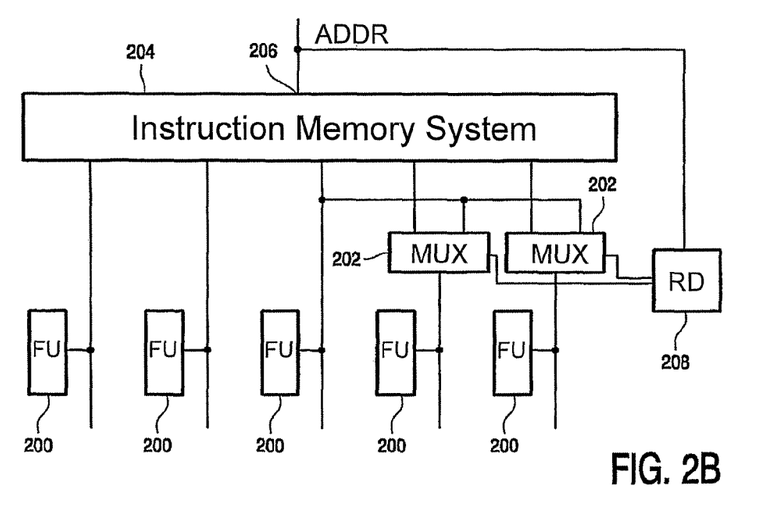
FIG. 2B shows part of a data processing apparatus

FIG. 2B shows an embodiment that additionally contains multiplexers 202, controlled by address range detector 208, between instruction memory system 204 and certain of functional units (or respective sub-groups of functional units) 200. One input of each of multiplexers 202 is coupled to a common instruction output of instruction memory system 204 for sharing by a group of functional units 200. For the sake of clarity only one output from instruction memory system 204 is shown to symbolize connections to functional units 200 and the register file. Multiplexers 202 each have another input coupled to a respective different instruction output of instruction memory system 204.

When address range detector 208 detects that the instruction address is in a certain range address range detector 208 may increase the number of groups of functional units 200 from which functional units are selected to execute an instruction from an instruction word, for example by splitting the group into two or more subgroups. When the instruction address is in the certain range address range detector 208 selects multiplexers 202 to supply different respective ones of the instructions from the instruction word to different functional units 200 or subgroups of functional units of a group of functional units 200. When the instruction address is outside the range address range detector 208 supplies the same instruction from the instruction word to all functional units in the group. In this case, a smaller instruction word is needed. Accordingly, instruction memory system 204 may disable certain memory units, or the address step size between successive instruction addresses may be reduced. Both reduce the amount of memory needed for instruction words.

Of course, more complicated forms of regrouping may be used, (subgroups of) functional units 200 being part of one group in one range and part of another group in another range, and/or forming a group by itself in a further range. Furthermore, the embodiment of FIG. 2A may be combined with that of FIG. 2B, so that different functional units 200 may be selected to execute one instruction from an instruction word dependent on the range of the instruction address, the functional units 200 each receiving there own instruction word in parallel in another range.

Of course, the embodiments of FIGS. 2, 2A and 2B may be combined, memory units being provided only for address ranges where instructions from these memory units are needed.

Also input section may add functional units to or remove functional units from the groups dependent on the range.

Figure 3:
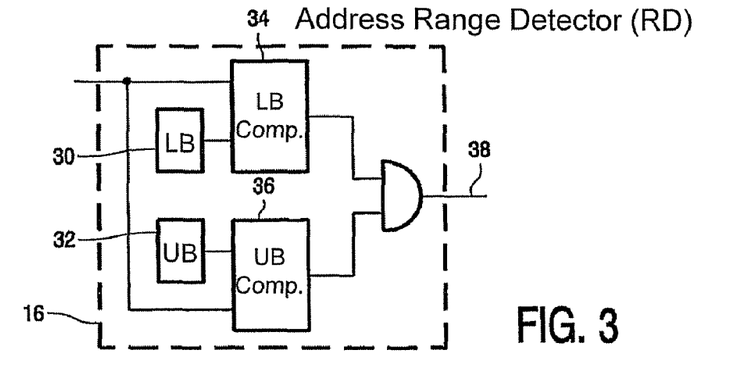
FIG. 3 shows an address range detector

FIG. 3 shows an embodiment of address range detector 16. Address range detector contains a lower bound source 30, an upper bound source 32, a lower bound comparator 34, an upper bound comparator 36 and an AND gate 38. The lower bound source 30 is coupled to a first input of lower bound comparator 34 and the upper bound source 32 is coupled to a first input of upper bound comparator 36. An input for the instruction address is coupled to second inputs of upper bound comparator 36 and lower bound comparator 34. The outputs of upper bound comparator 36 and lower bound comparator 34 are coupled to inputs of AND gate 38, whose output is the output of address range detector 16.

In operation comparators 34, 36 compare the instruction address with the upper and lower bound from sources 30,32. When the instruction address is between these bounds AND gate 38 outputs one signal value and, if not, it outputs another signal value. Sources 30,32 may be hardwired when it is known in which address range programs contain instructions in the inner loop. Alternatively, sources 30, 32 may contain on or more registers whose content determines an upper bound value and a lower bound value (by setting both upper and lower bound values, or by setting for example only a lower bound, the upper bound having a predetermined offset with respect to the lower bound). These registers may be loaded with appropriate values when the program is loaded into memory units 20,22. Alternatively, these values may be set as a result of execution of instructions.

Preferably, the address range for which the first one of the memory units 20 stores relatively wide instructions is also adjustable. This may be realized by using only a less significant part of the instruction address to address the first one of the memory units 20, the address range detection being used to activate the first one of the memory units 20. Alternatively, the lower bound may be subtracted from the instruction address and used as address for the first one of the memory units 20 in this case. When one or more registers are used to provide the bounds, the relevant address ranges can thus be set by loading these registers. Thus, the address ranges with wider instructions can be set dependent on the program involved. In preparation of execution of a part of a program that involves entering and exiting into and from an inner loop, the bound can be loaded.

Of course, address range detector 16 can easily be extended to distinguish between more than two ranges or to detect instruction addresses in ranges with disjoint parts. In this case a different treatment may be given to instructions from each range and memory units 20,22 may be provided for each range.

More generally a memory mapping unit (MMT) may used to select at run time which physical memory is addressed by which logical instruction address. In this case, according to one aspect of the invention, the width of different physical memories differs. When a program is loaded instruction words from an inner loop are stored in a wider memory. The MMU is set to map the logical instruction addresses of these instruction words to physical addresses in the wider physical instruction memory. During execution the MMU maps the logical instruction addresses accordingly and the memory returns instruction words with a width that depends on the physical memory that is physically addressed by the MMU.

Figure 4:
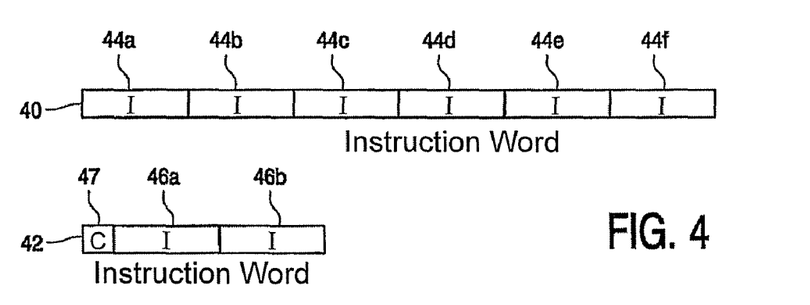
FIG. 4 shows instruction words for the processing apparatus

FIG. 4 shows examples of functional instructions words 40, 42 that may be supplied to instruction execution unit 14. A first type of instruction word 40 is used when the instruction address is in one range and a second type of instruction word 42 is used when the instruction address is in another range. The first type of instruction word is wider, containing more instructions 44*a-f* than the second type of instruction word 42 (with instructions 46*a,b* and a code 47 for selecting which of the functional units 142 should execute the instructions).

Different treatment of instruction words may be implemented by design of input section, with address range dependent routing of instructions from the received instruction words to the functional units. Alternatively, different treatment may be implemented using conventional processing of compressed instruction words. In this case, the apparatus adds or modifies codes that are provided to guide decompression of the instruction words, the codes being constructed dependent on the address range of the instruction. The codes are supplied in instruction execution unit 14, causing instruction execution unit to treat the instruction words dependent on the address range as a result of the added or modified codes. For example, a code indicating that all groups of functional units should process instructions could be added when the instruction address is in a first range, whereas a code from instruction memory, indicating a selection of a subset of the functional units could be supplied when the instruction address is in a second range, or the latter code could be generated when the same functional units should always be used when the instruction address is in the second range.

The functional units may include dedicated purpose functional units, such as units that perform functions to speed up MPEG decoding or encoding. Typically only specific parts of programs contain instruction words with instructions for such special purpose functional units. By accepting instructions for these functional units only when the instruction address is in a certain range, it is not necessary to provide instruction space for such functional units for instructions with addresses outside that range. In this case, the instruction word in both ranges may even have the same width. Because it is known that no instructions for a subset of the functional units are encoded in the instruction words when the instruction address is outside a certain range, more space is available for encoding instructions for other functional units in instruction words that are stored outside that certain range.

Figure 5:
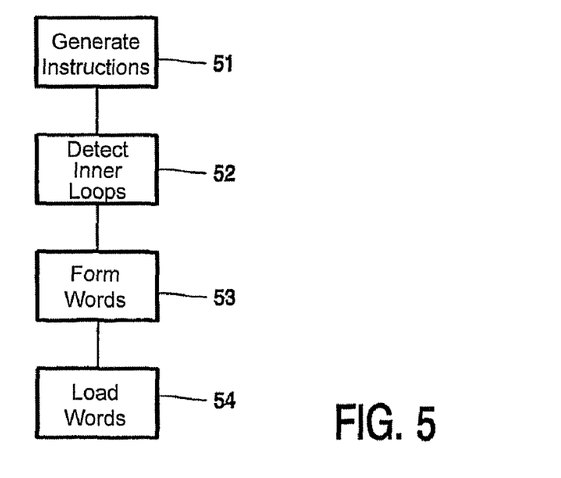
FIG. 5 shows a flow chart programming the data processing apparatus

FIG. 5 shows a flow chart for programming the processing apparatus of FIG. 1. In a first step 51 of the flow chart a program is compiled and instructions are generated for executing the program. In a second step 52, the position of the inner loop (or loops) in the program are determined. This may be done by automatic code inspection, or by profiling (that is, counting the number of times different instructions are executed during trial execution for typical input data). In a third step, 53 the instruction words are formed, the instruction words in the inner loops being optimised, for example by using known techniques such as (partial) loop unrolling, or by providing instructions for special purpose functional units. In a fourth step 54 the instruction words are loaded into instruction memory system 12 so that the instruction words in the inner loop are stored at memory locations with instruction addresses in the range where instruction memory system stores wider instruction words, or where instruction execution unit selects to execute more instructions from the instruction word in parallel. Alternatively, the bounds of the range are set according to the locations where the instruction words of the inner loop have been loaded.

Figure 6:
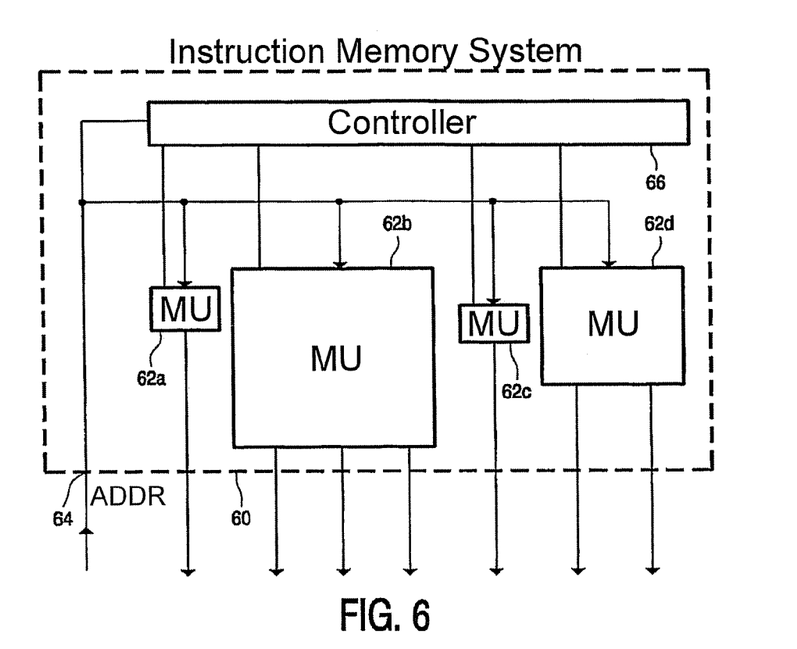
FIG. 6 shows an embodiment of an instruction memory system

FIG. 6 shows a further instruction memory system 60 for implementing an aspect of the invention. Instruction memory system 60 has a single instruction address input 64, a controller 66 and contains a plurality of memory units 62*a-d* at least part of instruction address input 64 is coupled to address inputs of each of the memory units 62*a-d*. At least part of the instruction address input is coupled to controller 66. Controller 66 is coupled to each of the memory units 62*a-d* individually to make each memory units 62*a-d* responsive to instruction addresses in a respective address range that is particular to the memory, the address ranges of different memory units 62*a-d* may overlap and they may contain mutually different numbers of instruction addresses. (This is symbolized by the fact that the memory units 62*a-d* span different vertical height ranges in the figure). Similarly, each memory unit 62*a-d* may have its own width, i.e. the width of the instruction data that is addressed with an instruction address may differ from one memory to another. (This is symbolized by the fact that the memory units 62*a-d* span different horizontal widths in the figure).

In operation a processing unit (not shown) supplies successive instruction addresses to instruction memory system 60. Dependent on the value of the instruction address, controller 66 signals one or more of the memory units 62a-d to respond. The selected memory units 62a-d each retrieve part of an instruction from the memory units 62a-d (or the whole instruction word, if only one memory unit 62a-d is selected). The parts of the instruction from different ones of the memory units 62a-d are supplied, in combination, as an instruction word to the processing unit (not shown). Preferably clock signals in one or more of the instruction units 62a-d are disabled when they are not selected.

Figure 7:
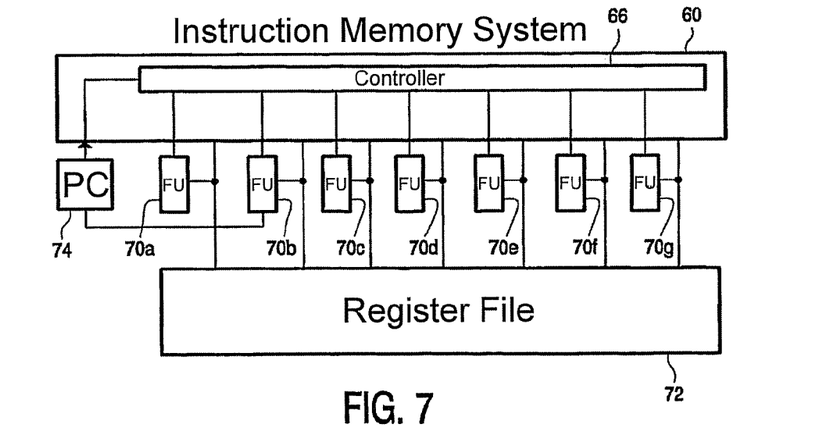
FIG. 7 shows a data processor apparatus

FIG. 7 shows a processor using memory system 60 of FIG. 6. The processor contains a plurality of functional unit groups 70a-g, a register file 72 and a program counter 74. Each functional unit group may contain one or more functional units (not shown). The selection outputs of controller 66 in memory system 60 are coupled to clock enable inputs of the functional unit groups 70a-g. The instruction outputs of the memory units (not shown for the sake of clarity) of instruction memory system 60 are coupled to instruction selection inputs of the functional unit groups 70a-g, to operand register selection inputs and to result register selection inputs of register file 72. Functional unit groups 70a-g have operand inputs and result outputs coupled to register file 72 (for the sake of clarity all these connections are shown by a single line, although in practice independent connections are used).

In operation, each memory unit of instruction memory system 60 is dedicated to one or more groups of functional units 70a-g. Clock signals in one or more of the groups of functional units 70a-g are disabled when the selection signals from controller 66 indicate that the corresponding memory unit of the group of functional units 70a-g is not selected. Thus, the functional units in the group receive no clock signals and power consumption is further reduced.

However, it will be understood that the instruction memory system of FIG. 6 can be used independently of the embodiment of FIG. 7. That is, the clock signals in the functional unit groups need not be disabled. Neither is it necessary that there is a fixed relation between memory units and functional unit groups (although such a fixed relation speeds up processing and simplifies the circuit).

The invention claimed is:

1. A data processing apparatus, the apparatus comprising:
an instruction address generation circuit for outputting an instruction address;
an instruction memory system arranged to output an instruction word addressed by the instruction address, including at least one type of memory selected to achieve a desired instruction cycle time wherein longer instruction words are stored in said memory system within memory ranges of progressively shorter instruction words associated with a corresponding memory type;
an instruction execution unit, arranged to process a plurality of instructions from the instruction word in parallel;
a detection unit, arranged to detect in which of a plurality of ranges the instruction address lies, the detection unit being coupled to the instruction execution unit parallelizes processing of the instructions from the instruction word, dependent on a detected range.

2. A data processing apparatus according to claim 1, wherein the instruction execution unit and/or the instruction memory system is arranged to adjust a width of the instruction word that determines a number of instructions from the instruction word that is processed in parallel, dependent on the detected range.

3. A data processing apparatus according to claim 1, wherein the instruction execution unit comprises a plurality of functional units, the instruction execution unit being arranged to select a subset of the functional units that is available for processing the instruction, dependent on the detected range.

4. A data processing apparatus according to claim 1, wherein the instruction execution unit comprises a plurality of functional units, the instruction execution unit being arranged to select whether functional units or groups of functional units from a set of functional units each receive respective instructions from the instruction word, or receive a shared instruction from the instruction word, dependent on the detected range.

5. A data processing apparatus according to claim 2, wherein the instruction memory comprises a first memory unit and a second memory unit, providing storage with a first and second unit of width of addressable memory locations for instructions words of different lengths with addresses in a first and second range respectively, the first and second unit of width being mutually different.

6. A data processing apparatus of claim 5, programmed to execute a program, longer instruction words from a inner loop of the program being stored in the first memory unit, shorter instruction words from a majority of the program outside the inner loop being stored in the second memory unit, the first unit of width being larger that the second unit of width.

7. A data processing apparatus according to claim 5, comprising a memory mapping unit arranged to map the instruction address onto the first memory unit or the second memory unit, dependent on the detected range.

8. A data processing apparatus according to claim 5, wherein the instruction memory system is arranged to disable supply of clock signals to the first memory unit when addresses in the second range are detected.

9. A data processing apparatus according to claim 5, wherein the instruction memory system is arranged to disable supply of clock signals to all but the memory unit from whose address range addresses are detected.

10. A data processing apparatus according to claim 2, wherein the instruction memory system comprises a plurality of memory units, each arranged to be responsive to instruction addresses in a respective range, the instruction memory allowing partial overlap of the respective range, the instruction memory system being arranged to supply the instruction word as a combination of instructions from those of the memory units in whose respective range the instruction address lies.

11. A data processing apparatus according to claim 10, wherein the instruction memory system is arranged to disable supply of clock signals to at least one of the memory units when the instruction address is not in the respective range of said at least one of the memory units.

12. A data processing apparatus according to claim 10, wherein the execution unit comprises groups of one or more functional units, each group being coupled to a respective predetermined one of the memory units, for receiving instructions from the instruction words, when the instruction address is in the respective range of the respective predetermined one of the memory unit to which the group is coupled.

13. A method of programming a data processing apparatus comprising:
generating a program of machine instructions for the apparatus;
identifying an inner loop of the program;
loading the program into the instruction memory system, said memory system includes at least one type of memory selected to achieve a desired instruction cycle time, so that instructions from the inner loop are loaded at memory locations with instruction addresses in a range of addresses for which the apparatus provides a higher degree of parallelism than another range of addresses, wherein longer instruction words are stored in said memory system within memory ranges of progressively shorter instruction words and are associated with a corresponding memory type.

14. A method of executing a program with a data processing apparatus, the method comprising:
using an instruction address to fetch an instruction word;
executing instructions from the fetched instruction word;
detecting in which of a plurality of ranges the instruction address list lies, controlling a way in which instruction execution is parallelized dependent on a detected range, wherein longer instruction words are contained within ranges of shorter instruction words and instructions words are stored in a type of memory selected to achieve a desired instruction cycle time.

15. A method according to claim 14, the method comprising adapting a width of the fetched instruction word dependent on the detected range.

16. A method according to claim 14, the method comprising changing a selection of functional units of the apparatus that is used to execute the instructions dependent on the detected range.

* * * * *

UNITED STATES PATENT AND TRADEMARK OFFICE
CERTIFICATE OF CORRECTION

PATENT NO. : 8,364,935 B2
APPLICATION NO. : 10/530495
DATED : January 29, 2013
INVENTOR(S) : Sethuraman et al.

It is certified that error appears in the above-identified patent and that said Letters Patent is hereby corrected as shown below:

On the Title page, Item (56), under "FOREIGN PATENT DOCUMENTS", in Column 2, Line 2, delete "EP 0324308 A3 7/1989" and insert -- EP 0324308 A3 3/1991 --, therefor.

On Title Page 2, Item (56), under "FOREIGN PATENT DOCUMENTS", in Column 2, Line 1, delete "EP 0324308 B1 7/1989" and insert -- EP 0324308 B1 3/1996 --, therefor.

In the Specification

In Column 2, Line 67, delete "apparatus" and insert -- apparatus. --, therefor.

In Column 6, Line 48, delete "there" and insert -- their --, therefor.

Signed and Sealed this
Eleventh Day of March, 2014

Michelle K. Lee
*Deputy Director of the United States Patent and Trademark Office*